Aug. 19, 1952     R. E. BOYDEN ET AL     2,607,526
INTERLOCKING AND FUNCTION CONTROL DEVICE

Filed July 12, 1948     9 Sheets-Sheet 1

INVENTORS
ROBERT E. BOYDEN
BY HOLLAND H. FREEMAN

ATTORNEY

INVENTORS
ROBERT E. BOYDEN
HOLLAND H. FREEMAN
BY
ATTORNEY

Aug. 19, 1952    R. E. BOYDEN ET AL    2,607,526
INTERLOCKING AND FUNCTION CONTROL DEVICE
Filed July 12, 1948    9 Sheets-Sheet 4

INVENTORS
ROBERT E. BOYDEN
HOLLAND H. FREEMAN
BY
Fred N. Schwal
ATTORNEY

Aug. 19, 1952     R. E. BOYDEN ET AL     2,607,526
INTERLOCKING AND FUNCTION CONTROL DEVICE
Filed July 12, 1948                      9 Sheets-Sheet 6

INVENTORS
ROBERT E. BOYDEN
BY HOLLAND H. FREEMAN
ATTORNEY

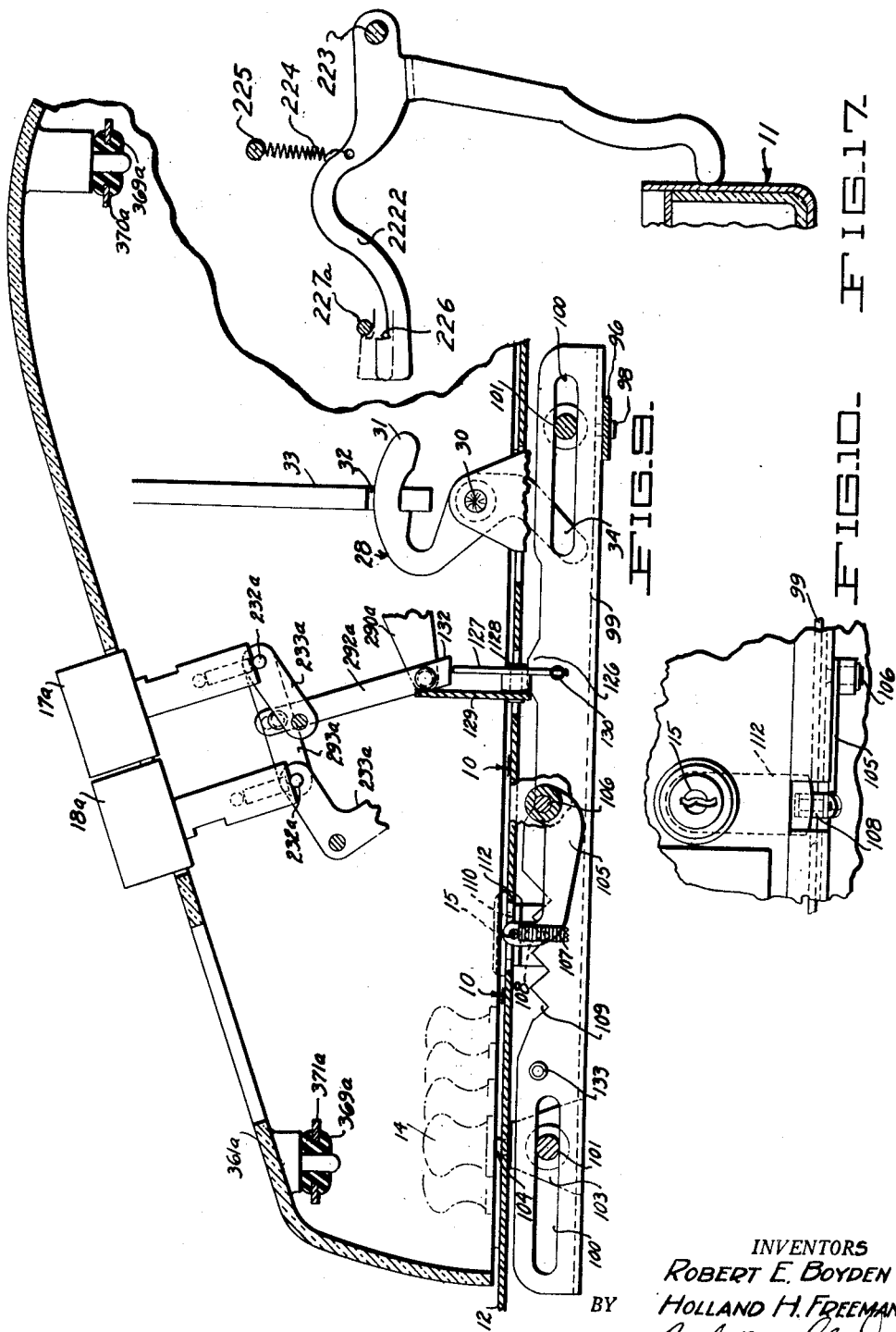

Aug. 19, 1952  R. E. BOYDEN ET AL  2,607,526
INTERLOCKING AND FUNCTION CONTROL DEVICE
Filed July 12, 1948  9 Sheets-Sheet 8
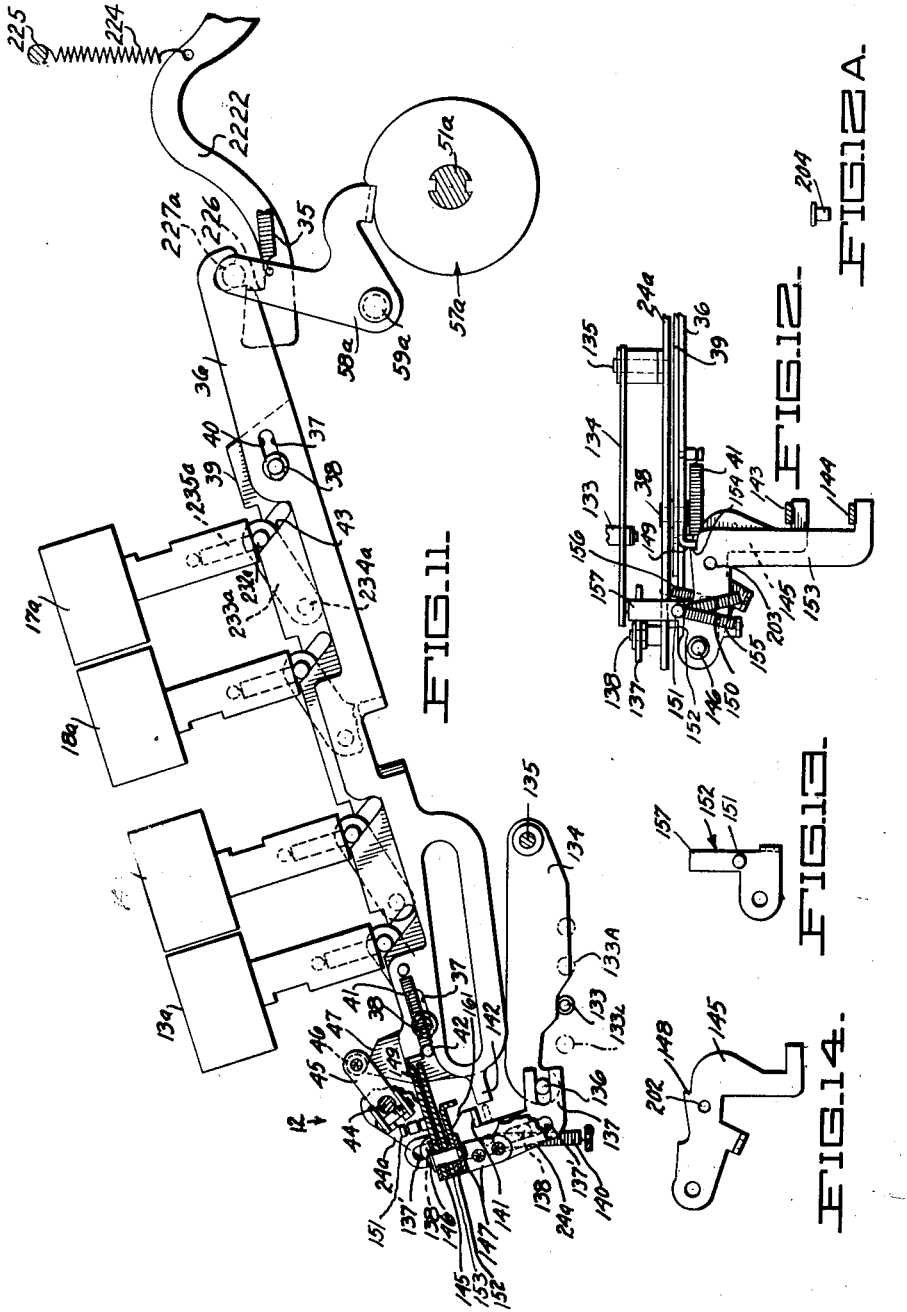
INVENTORS
ROBERT E. BOYDEN
HOLLAND H. FREEMAN
BY
ATTORNEY Aug. 19, 1952     R. E. BOYDEN ET AL     2,607,526
INTERLOCKING AND FUNCTION CONTROL DEVICE
Filed July 12, 1948     9 Sheets-Sheet 9
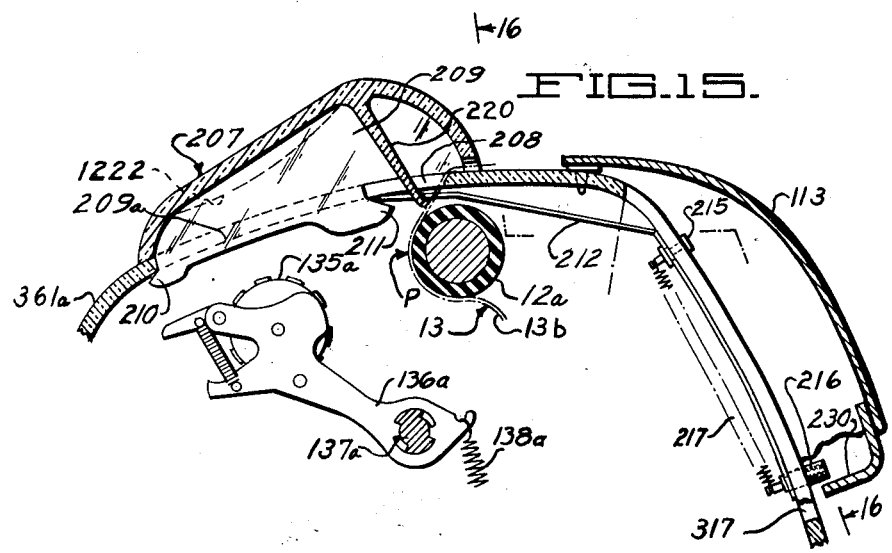
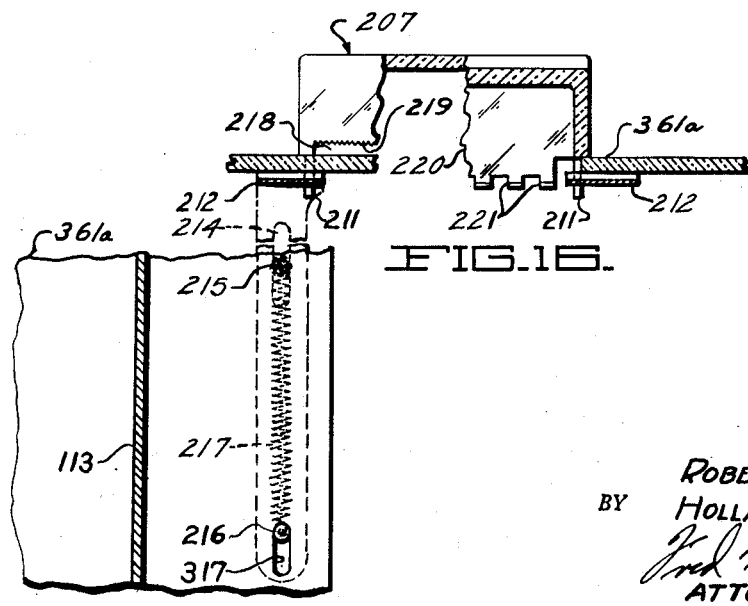
INVENTOR.
ROBERT E. BOYDEN
HOLLAND H. FREEMAN
BY
ATTORNEY Patented Aug. 19, 1952

2,607,526

UNITED STATES PATENT OFFICE 2,607,526

INTERLOCKING AND FUNCTION CONTROL DEVICE

Robert E. Boyden, Los Angeles, and Holland H. Freeman, Arcadia, Calif., assignors to Clary Multiplier Corporation, Los Angeles, Calif., a corporation of California Application July 12, 1948, Serial No. 38,294

12 Claims. (Cl. 235—22)

This invention relates to keyset, power driven, cash registering machines and has for its principal object the provision of an improved machine of this type. However, certain features of the invention are applicable to machines of types other than that disclosed herein.

Another object of the invention is to facilitate use of the machine selectively as an adding machine and as a cash register.

Another object is to provide a single manipulatable control for selectively conditioning the machine to operate as an adding machine and as a cash register and to both lock and unlock the cash drawer and other parts of the machine.

Another object is to provide an improved enforced designation control mechanism for requiring proper entry of certain factors in the machine.

Another object is to provide an enforced designation mechanism which is automatically effective when the machine is conditioned for use as a cash register and is ineffective when the machine is conditioned for use as an adding machine.

Another object is to prevent misoperation of the machine either accidently or by purpose.

Another object is to selectively prevent operation of the machine when the cash register is in an open position.

Another object is to prevent unauthorized opening, tampering, or dismantling of the machine.

The manner in which the above and other objects of the invention are accomplished will be readily understood on reference to the following specification when read in conjunction with the accompanying drawings wherein:

Fig. 2A is a sectional view taken along line 2A—2A of Fig. 2.

Fig. 9 is a sectional elevational view taken substantially along the line 9—9 of Fig. 1 showing part of the machine conditioning controls and part of the resilient mounting for the machine cover.

Fig. 10 is a fragmentary sectional plan view taken along the line 10—10 of Fig. 9 illustrating the lock for the machine conditioning controls.

Fig. 11 is a sectional elevational view of the clutch controls and the means for rendering the same effective and ineffective.

Fig. 12 is a plan view illustrating certain of the mechanism shown in Fig. 11 and is taken in the direction of the arrow 12 of that figure.

Fig. 12A is a detail view of a coupling pin for the clutch control slide blocking levers.

Figs. 13 and 14 are detailed plan views of certain of the elements shown in Figs. 11 and 12.

Fig. 15 is a sectional side elevational view of a portion of the machine illustrating a transparent printer opening cover attached therein.

Fig. 16 is an end view partly in section of the printer opening cover.

Fig. 17 is a sectional side elevation of the cash drawer controlled blocking lever for the clutch control mechanism.

Figure 1:
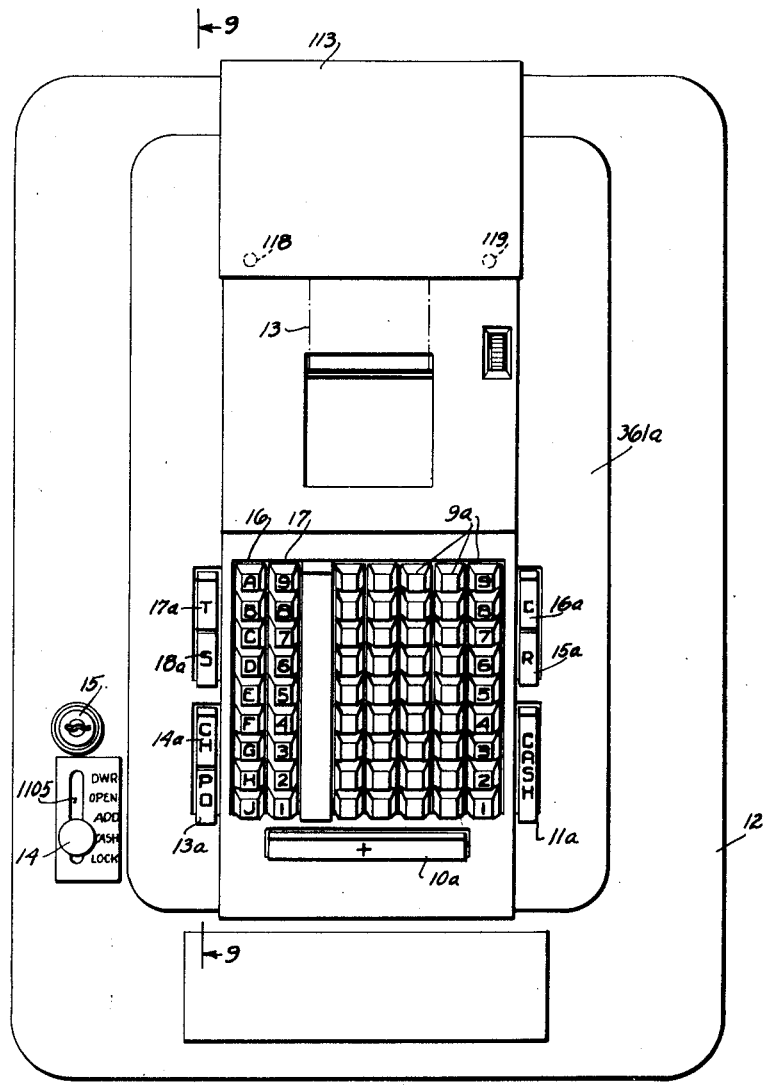
Fig. 1 is a plan view of the cash registering machine.

The particular embodiment of the invention disclosed herein is applied to the well known and commercially available Clary adding machine disclosed and claimed in the copending application of R. E. Boyden, Serial Number 582,553, filed March 13, 1945, now Patent No. 2,583,810, issued January 29, 1952. The accumulator of said machine is disclosed and claimed in the copending application of E. P. Drake, Serial Number 582,554, filed March 13, 1945, and since matured into Patent No. 2,472,696, issued on June 7, 1949. Therefore, only those parts of said machine which intimately relate to the present invention will be disclosed herein and reference may be had to said applications for disclosure of details not disclosed herein.

All elements indicated herein by reference numerals accompanied by the letter "a" identify similarly numbered elements disclosed in said application hereinabove referred to.

The machine comprises, in general, a computing section enclosed by a cover or housing part 361a, and a cash drawer section, including a cash drawer 11, enclosed by a cover 12 underlying the computing section.

A paper strip indicated by dot and dash lines 13, on which the various items entered in the machine and totalled out thereof are recorded, is passed over a platen 12a to a position wherein such items are visible and is then fed under a cover or housing part 113 extending between the covers 361a and 12.

The machine is adapted to be selectively set into different operating conditions by a settable knob 14 movable to any of five different positions and adapted to be locked in any four thereof by a key actuated lock 15.

The machine is controlled by a keyboard comprising amount keys 9a upon which items to be entered in the machine are set. The two left hand rows 16 and 17 of amount keys are provided for designation purposes only and items set therein are subsequently printed as symbols but are not accumulated.

Add bars 10a and 11a are provided to cause the machine to additively enter items set up on the keys 9a into the accumulator and to print such items on the paper strip 13. A minus bar 13a is provided to subtract items entered in the keys 9a from the accumulator. This bar acts as a "paid out" control bar when the machine is operated as a cash register. A non-add bar 14a is provided to print items only and this bar acts as a "charge" bar when the machine is operated as a cash register. Total and sub-total bars 17a and 18a, respectively, are provided to total or sub-total items from the accumulator when the machine is operating in certain conditions.

If it is desired to add the same amount in the accumulator two or more times, a "repeat" bar 15a is depressed and held down until the requisite number of additions are made and if it is desired to subtract the same amount a number of times, the bar 13a and repeat bar 15a are simultaneously depressed and the latter is thereafter held down the requisite number of times causing a like number of subtractions to occur.

A "correction" bar 16a is provided to release any of the keys 9a which may be depressed, without starting the motor.

Setting of the control conditioning knob 14 into its foremost "lock" position permits depression of any of the keys or bars in the keyboard but renders the same ineffective to cause operation of the machine and consequent entry of items therein and also locks the various parts against unauthorized entry, opening of the drawer, or dismantling of any of the parts.

Upon setting the knob to its illustrated "cash" position, means controlled thereby will allow operation of the control bars except bars 17a and 18a. In this condition of the machine, the cash drawer 11 will be automatically released on each operation of the machine.

Setting of the control knob 14 into its "add" position enables control of the machine by all of the control bars but prevents release of the cash drawer and also prevents removal of the rear cover 113.

Movement of the knob 14 to "open" position enables control of the machine by any of the control bars and also causes the cash drawer to automatically open during each operation of the machine. Further, the rear cover 113 is unlatched, enabling its removal for the purpose of removing or replacing the paper tape 13.

Movement of the knob 14 to "drawer" position directly causes release of the cash drawer 11 and release of the rear cover 113 in the event it is desired to gain access to the cash drawer or the machine when the current supply is unavailable or when the machine becomes inoperative.

Figure 2:
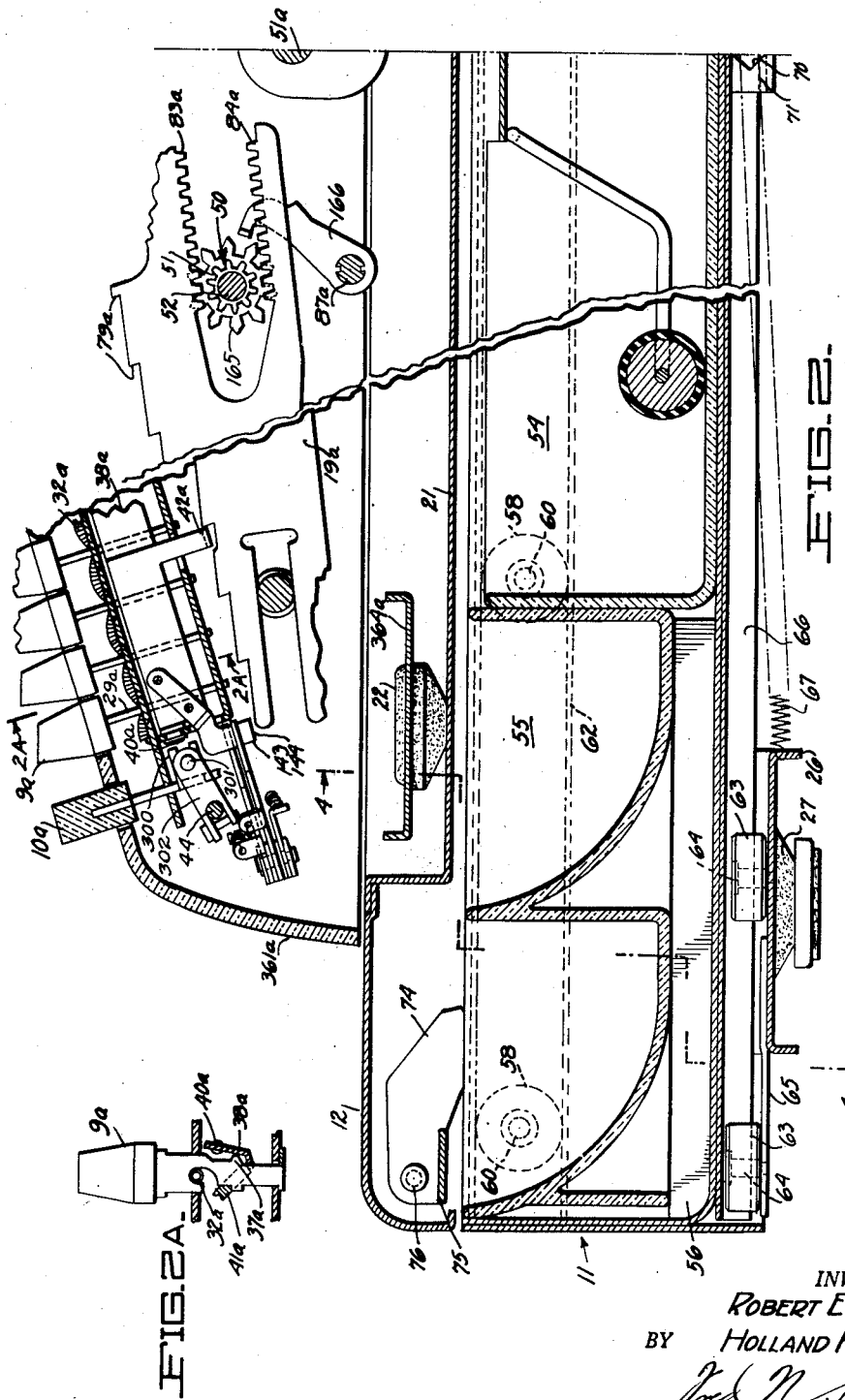
Figs. 2 and 3 are co-extensive longitudinal sectional veiws of the machine.
Figure 3:
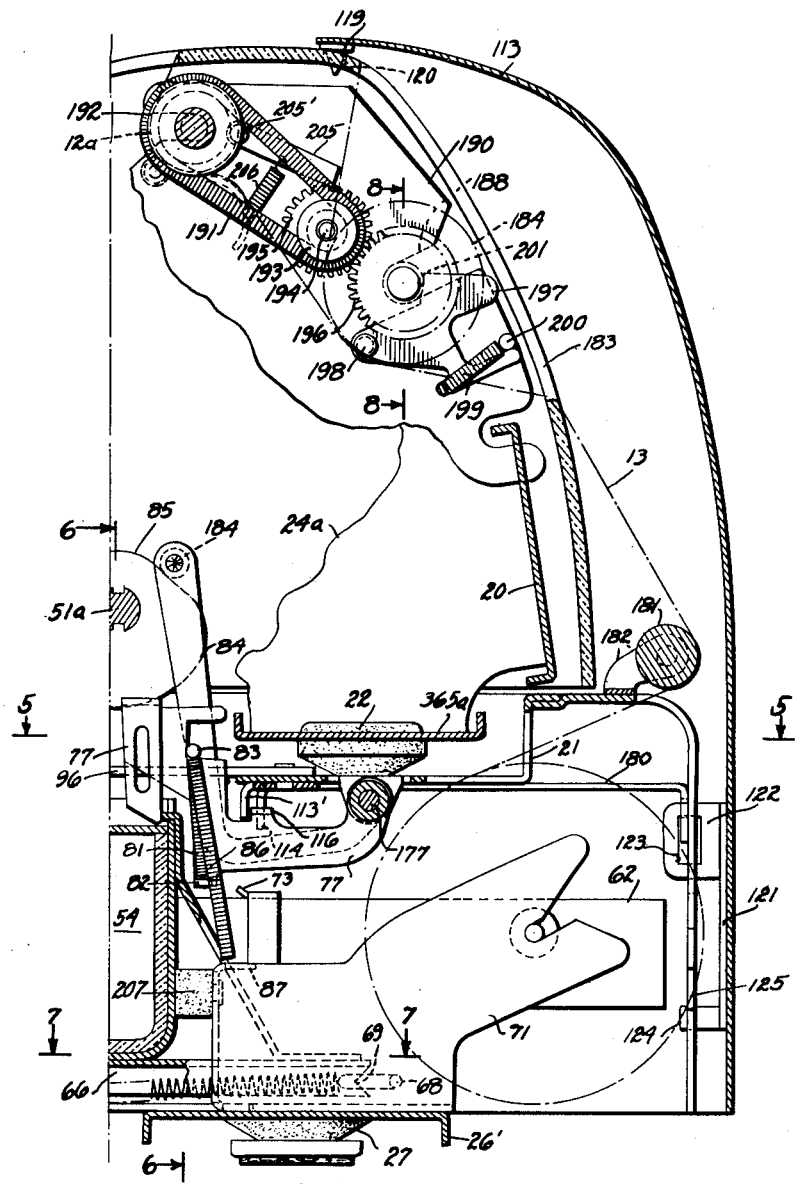
Figure 4:
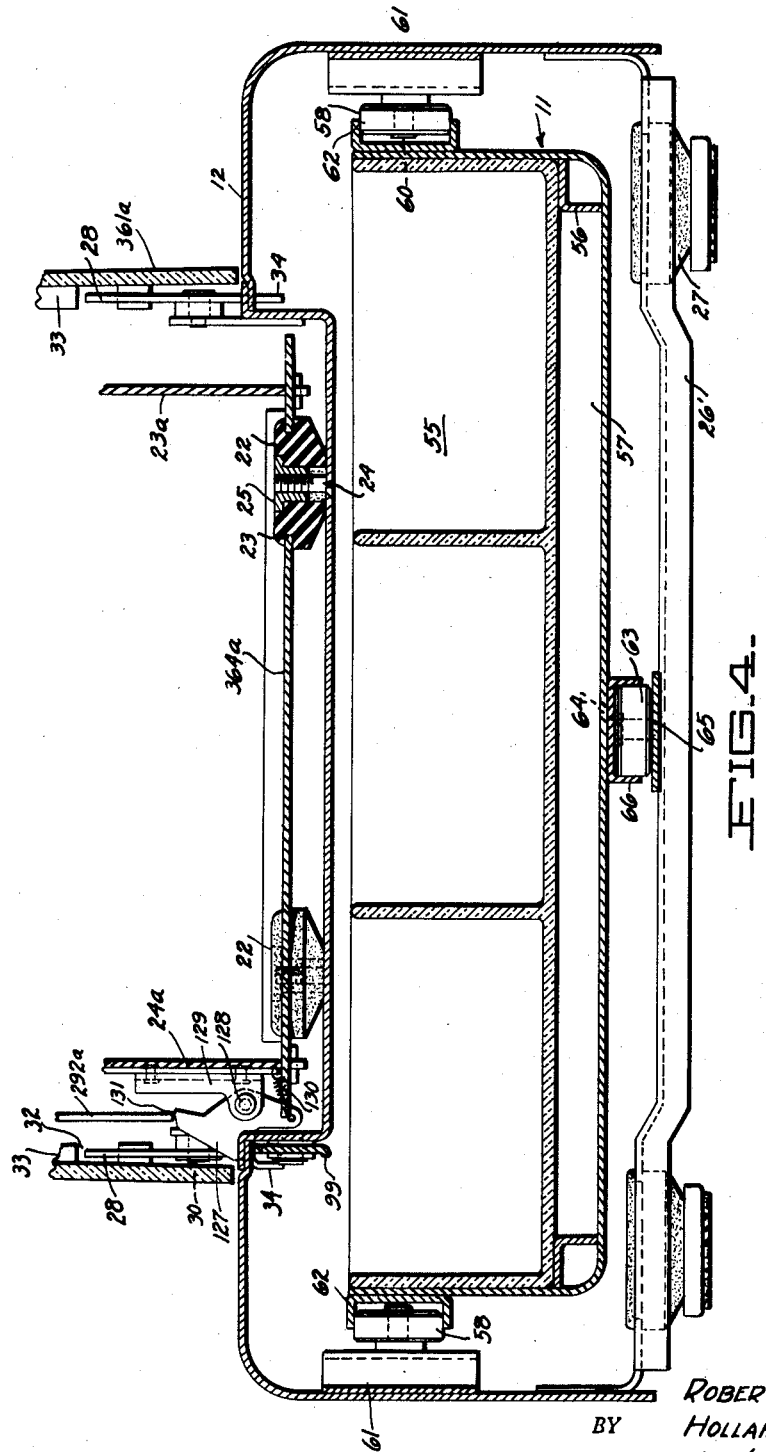
Fig. 4 is a transverse sectional view and is taken substantially along the line 4—4 of Fig. 2.

The motor driven computing mechanism housed in the cover 361a is supported by a frame comprising two main side frame plates 23a and 24a (Figs. 3 and 4) rigidly secured in spaced relation by cross braces 20, 364a and 365a (Figs. 2, 3 and 4). This frame and the mechanism carried thereby is resiliently supported upon a tray 21 integral with the drawer cover 12 through four resilient supporting units 22. Each of said units comprises a body of rubber or the like having a circumferential groove 23 therein fitted into a circular hole in the cross brace 364a or 365a. The body 22 is held in position upon the tray by a screw 24 extending through the latter and threadably mounted in a bushing 25 fitted within the body.

The drawer cover 12 which supports the computing mechanism is, in turn, resiliently supported. A pair of cross braces 26 and 26' (Figs. 2 and 3) are rigidly secured to the sides of the cover 12 below the cash drawer 11 and are supported by four feet 27 of vibration absorbing material.

The computing mechanism cover 361a is resiliently supported by the main frame plate through vibration absorbing mounts 369a (Fig. 9) of rubber or the like mounted on brackets 370a and 371a suitably secured to the frame plates 23a and 24a in a manner not shown.

Means are provided to releasably lock the cover 361a in place and comprises lock levers 28 (Figs. 4 and 9) on opposite sides of the machine. The levers are pivoted at 30 to brackets extending upward from the tray 21. Each locking lever, when in its illustrated locking position, as shown in Fig. 9, is located with an arcuate portion 31 extending into a slot 32 formed in a rib 33 extending from the wall of the cover. The lever is unlocked by pressing on a tail portion 34 to rock the lever counter-clockwise out of engagement with the slot 32. It will be noted that the lock levers 28 are accessible only from within the cash drawer cover and only when the cash drawer 11 is removed, thus preventing unauthorized entrance into the computing section when the drawer 11 is locked in closed position.

From the foregoing it will be seen that the computing machine and cash drawer mechanism are insulated from each other to reduce the tendency of vibration emanating from one to be transmitted to the other or to the supporting surface.

As disclosed in the aforementioned R. E. Boyden application S. N. 582,553, the computing mechanism is motor driven and includes a cyclic clutch 57a (Fig. 11), the driven side of which is operatively connected to the motor (not shown) and the driving side is secured to a rotatable shaft 51a. Each rotation of the shaft causes a cycle of operation of the machine in accordance with the particular control bar depressed and the item entered or the total taken from the accumulator is printed on the paper strip 13 (Figs. 1 and 3) at a point where the latter passes over the platen 12a.

The clutch 57a is engaged by rocking a clutch control dog 58a about its pivotal support 59a out of contact with the clutch. However, the dog is normally held in its illustrated clutch disengaging position by a tension spring 35 extending between the dog and the machine frame.

Means are provided for normally causing engagement of the clutch upon depression of any of the motor control bars and comprises a slide 36 having a slot therein embracing a stud 227a on the dog 58a. The slide is guided for lengthwise movement by guide studs 38 mounted on the frame plate 24a (see Fig. 12) and extending through guide slots 37 in the slide. The slide 36 is resiliently connected to a cam slide 39 having guide slots 40 also slidably embracing the guide studs 38. For this purpose, a tension spring 41 is attached at one end thereof to a stud extending from the slide 36 and at the other end thereof to a stud 42 extending from the slide 39. The spring 41 normally holds the stud 42 in engagement with the forward end of the slide 36 whereby both slides will move as a unit. The spring 41 is stronger than the spring 35 and, consequently, when the slide 39 is moved forward the slide 36 will follow to cause engagement of the clutch unless restrained from such movement in a manner to be described hereinafter.

The slide 39 has four inclined cam slots 43, each cooperating with a pin 232a extending from a link 233a pivoted on a frame stud 234a. Each link is normally held in its illustrated position by a spring 235a extending between the pin 232a and a frame stud. Also, each pin underlies the stem of one of the group of control bars 13a, 14a, 17a and 18a, whereby depression of any of said control bars will actuate the slide 39 and, consequently, normally cause engagement of the clutch.

The slide 39 is also actuated on depression of the control bar 10a which is effective to rock a shaft 44 pivotally supported in the side frame plates 23a and 24a. The stem of bar 10a has a bifurcated ear 300 embracing a pin 301 carried by an arm 302 fastened to the shaft 44. Shaft 44 is secured to an arm 45 having a roller 46 thereon engaging a cam surface 47 formed on the slide 39 whereby to move the latter forwardly to cause engagement of the clutch in the same manner as depression of any of the control bars shown in Fig. 11. Control bars 11a and 15a are also effective to actuate the slide 39 through suitable mechanism (not shown).

The accumulator, generally indicated at 50 (Fig. 2) is disclosed in detail in the aforementioned E. P. Drake application, S. N. 582,554, and comprises a series of accumulator gears 51, one for each order, rotatably mounted on a shaft 52 independently of each other. The latter shaft is raised or lowered, along with a second shaft 87a, by mechanism not shown herein to mesh the accumulator gears 51 with rack gear sections 83a or 84a of a drive rack 19a, depending on whether additive or subtractive operations are being performed. Each rack 19a is provided with a plurality of steps 79a cooperable with the key stems 29a of the aligned bank of amount keys. The racks 19a are yieldably driven forwardly by means (not shown) actuated by the shaft 51a during each cycle of the machine and thereby advance the associated accumulator gears. Thus, during item entry operations, the racks advance the associated accumulator gears a number of increments equal to the value of the depressed amount key in the aligned orders.

The various amount keys are normally held in raised position by extension springs 32a and the stem of each key has a combined camming lobe and latch shoulder 37a (Fig. 2A) thereon. When any amount key is depressed, the camming lobe 37a thereof engages a lock member 38a extending the length of the associated bank of keys and pivoted for outward swinging movement about a pair of coaxial pivot supports, one of which is shown at 40a. Thus, the associated lock member is swung outwardly against the action of a tension spring 41a to remove a zero stop 42a from a position blocking forward movement of the associated rack 19a and to release any previously depressed key in the same bank. At the bottom of its stroke, the upper surface of the cam lobe 37a of the depressed key stem is engaged and latched by the lock member 38a, thereby holding the key in depressed position.

The cash drawer 11 has a compartmented box 54 fixed therein and adapted to receive bills of different denominations. A second compartmented coin box 55 for receiving coins of various denominations is removably supported in the drawer in front of the box 54 and rests upon shoulders 56 (Figs. 2 and 4) integral with the bottom and sides of the box, leaving a space 57 to store other items.

The drawer is supported for movement into and out of the casing 12 by pairs of spaced rollers 58 rotatably mounted, on the opposite sides of the drawer, on studs 60 fixed to brackets 61 suitably secured to the sides of the casing 12. The rollers 58 are embraced by channel guide members 62 suitably secured to opposite sides of the cash drawer and extending rearwardly thereof as shown in Fig. 3. Lateral guiding of the drawer is effected by a pair of rollers 63 (Figs. 2 and 4) rotatably mounted on studs 64, one secured to the cross brace 26' and the other secured to a bracket 65 suitably secured to the brace 26. The latter rollers are embraced by a guide channel 66 suitably secured to the under surface of the drawer 11.

The drawer 11 is normally urged toward its open position by a tension spring 67 (Figs. 2, 3, 6 and 7) secured at one end thereof to the cross brace 26 and at the other end thereof to the apex of a V-shaped floating cross piece 68. When the drawer is in its closed position as illustrated, the piece 68 fits within notches 69 formed in the downwardly extending flanges of the channel member 66, thus urging the drawer forwardly. However, when the drawer is allowed to move to its open position, the piece 68 follows the channel member 66 until the wings thereof strike notches 70 (Fig. 2) formed in ears extending upwardly from a bracket 71 suitably secured to the rear brace plate 26'. The position of the piece 68 in this latter condition is illustrated by the dot and dash lines 68' in Fig. 7 and when the piece reaches this position it arrests the driving action of the spring, allowing the drawer to move forwardly under its own momentum until an inclined ear 73 (Fig. 3) on the upper outer edge of each side of the drawer strikes one of a pair of stop fingers 74 (Fig. 2) formed on opposite ends of a bail 75 which is pivotally mounted on studs 76 extending inwardly from the sides of the casing 12. The bail 75 normally rests in the position illustrated by virtue of its own weight and thus prevents complete removal of the drawer. However, if it is desired to completely remove the drawer, the operator opens the drawer and then reaches inside sufficiently to rock the bail counter-clockwise to raise the fingers 74 above the path of movement of the lugs 73, allowing the drawer to be completely removed.

Figure 5:
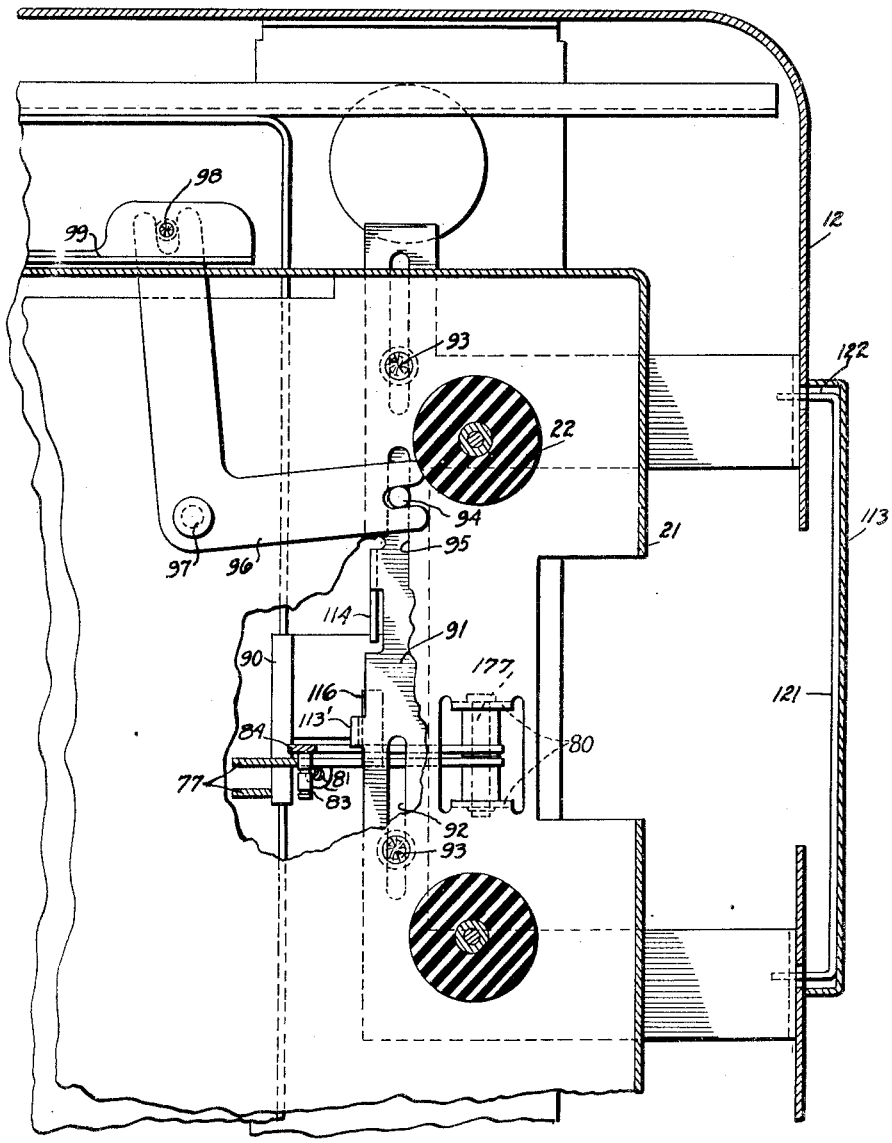
Fig. 5 is a sectional plan view taken substantially along the line 5—5 of Fig. 3, showing the drawer release latch mechanism and controls therefor.
Figure 6:
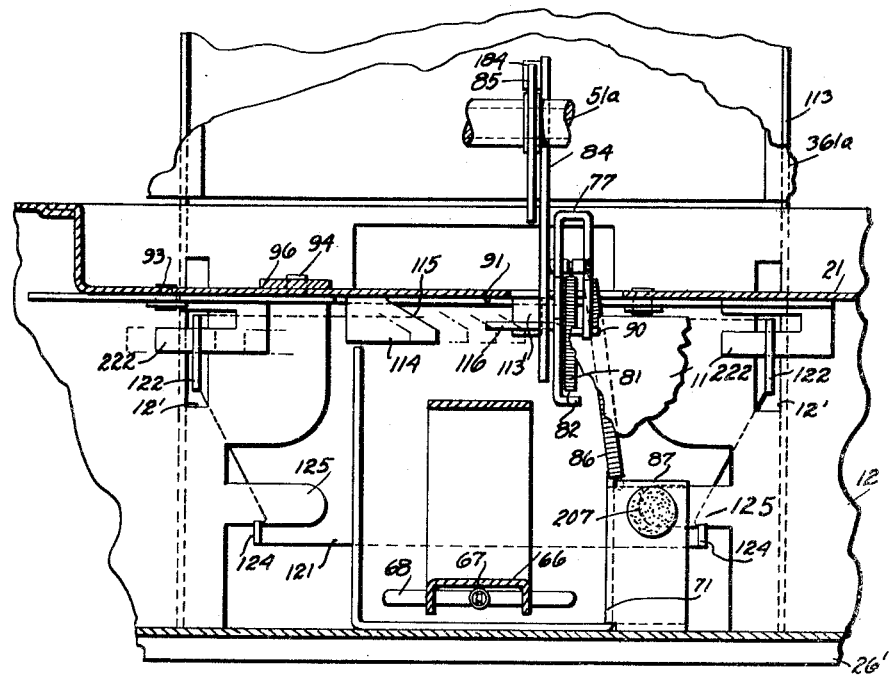
Fig. 6 is a transverse sectional view taken substantially along the line 6—6 of Fig. 3 showing the drawer release latch mechanism.
Figure 7:
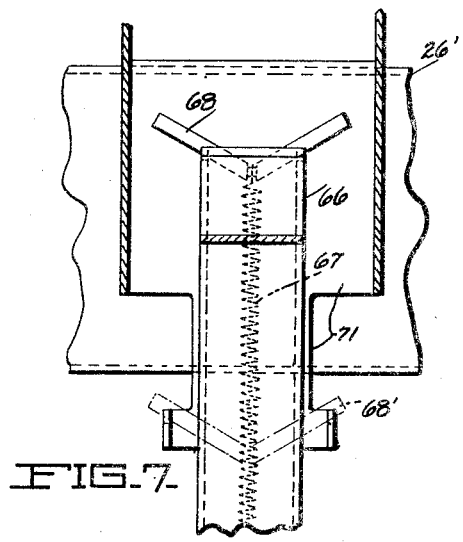
Fig. 7 is a sectional plan view taken along the line 7—7 of Fig. 3 illustrating the drawer actuating means.

The cash drawer 11 is normally held in its illustrated closed position by a latch 77 (Figs. 3, 5 and 6) which is U-shaped when viewed in Fig. 6 and is pivoted on a pin 177 supported by brackets 80 depending from the tray 21. The latch 77 is normally held in its illustrated latching position by a spring 81 extending between an ear 82 on the latch and a stud 83 carried by a cam follower 84.

The cam follower is also pivoted on the pin 177 and is provided with a roller 184 held in contact with a cam 85, secured on the shaft 51a, by a spring 86 tensioned between the stud 83 and an ear 87 on the bracket 71. From the above it will be seen that in such cases where the latch 77 is not locked, as will be described later, operation of the machine and consequent rotation of a cam 85 will rock the cam follower 84 and, through the spring 81, rock the latch 77 to release the tip thereof from latching engagement with a strike edge 90 provided at the rear of the drawer.

A rubber buffer 207 (Figs. 3 and 6) is attached to the bracket 71 and is arranged to arrest the drawer 11 when it is closed.

As stated hereinbefore, the cash drawer latch is rendered ineffective to release the drawer when the machine is conditioned for certain types of operation and for this purpose, the latch is adapted to be blocked in its latching position by a depending lug 113' on a cross slide 91. The latter has elongated slots 92 embracing and slidable along guide studs 93 fixed to the tray 21. The slide 91 is provided with a pin 94 extending upwardly through a slot 95 in the tray 21 and is fitted within a slot formed in a bellcrank 96 pivoted at 97 on the tray and connected by a pin and slot connection 98 to a control slide 99 (see also Figs. 4 and 9). The latter is provided with elongated guide slots 100 embracing guide studs 101 extending from the side of the tray 21 and is provided with an extension 103 to which is secured a stud 104 extending through an elongated slot 1105 (Fig. 1) in the top of the casing 12, terminating in the aforementioned knob 14. The slide 99 is centralized in each of the four positions corresponding to the "lock," "cash," "add" and "open" positions of the knob 14 by a centralizer 105 pivoted at 106 on the tray 21 and urged downwardly by a spring 107 tensioned between the lever and suitable portion of the frame (not shown) to urge a roller 108 on the lever into engagement with one of four notches 109 formed on the slide. The slide 99 and, consequently, the cross slide 91 (Fig. 5) operatively connected thereto, is adapted to be locked in any of the above four positions by the key controlled lock 15, the barrel of which is provided with a pivotal bearing portion 110 rotatably mounted in an aperture formed in the top of the casing 12. A lock arm 112 secured to the lock is arranged, when the lock is in its illustrated locking condition, to extend directly over the centralizer roller 108 (as shown in Fig. 10) preventing raising of the detent in the slide 99 in which it is located.

The blocking lug 113' (Figs. 3 and 6) on the cross slide 91 is so located that when the knob 14, and, consequently, the slide 91, is in its "lock" or illustrated "cash" positions, the lug will be located to the left (as viewed in Fig. 6) of a position overlying the drawer latch 77. However, upon movement of the knob into its "add" position, the lug 113' will overlie and block the latch whereupon the latter will be blocked and the spring 81 (Fig. 3) will merely yield as the cam follower 82 is actuated as an incident to a machine operation.

A camming lug 114 (Figs. 5 and 6) is also formed on the cross slide 91 and is provided with a cam surface 115 which, when the knob 14 is moved to "drawer" position will engage a lug 116 on the latch 77, thereby directly camming the latch upward into a drawer releasing position. It will thus be seen that the slide 91 selectively performs three functions; i. e., it is capable of directly moving the latch, blocking the latch from automatically releasing the drawer and rendering the latch effective to automatically release the drawer during a machine operation.

The cross slide 91 also forms the means for locking and unlocking the rear cover 113. Referring in particular to Figs. 1 and 3, the cover 113 is provided with a pair of downwardly extending conical studs 118 and 119 at the upper end thereof which are normally located in apertures 120 formed in the upper cover 36\1a. A bracket 121 is suitably secured to the cover 113 near the lower end thereof and has a pair of ears 122 extending therefrom and provided with apertures 123 therein. Said ears 122 are arranged to extend through apertures 12' (Fig. 6) formed in the casing 12 and the apertures 123 therein are adapted to receive locking fingers 222 formed on extensions of the cross slide 91.

Normally, when the cross slide 91 is in its "lock," "cash" and "add" positions the locking fingers 222 are inserted in the apertures 123, preventing removal of the cover 113. However, upon movement of the knob 14 to the "open" or "drawer" position the fingers 222 are removed from the apertures, permitting the latter to be removed from the machine. The cover 113 is yieldably held in position even when the knob is moved to the "open" or "drawer" positions by ears 124 which yieldably engage finger 125 formed in the rear of the casing 12.

As mentioned hereinbefore, totalling or sub-totalling of the accumulator is prevented when the machine is in its "cash" position and for this purpose the slide 99 (Fig. 9) is provided with a cam lobe 126 which, when the slide is moved into its "cash" position, as illustrated, engages and rocks a blocking lever 127 (see also Fig. 4), pivoted at 128 on a bracket 129 suitably fastened to the frame plate 24a. Thus, the lever 127 is moved against the action of a spring 130 tensioned between the lever and the frame into a position wherein a blocking shoulder 131 thereon underlies a projection 132 of a link 292a which is pivotally connected to a zero stop control lever 290a forming part of the totalling and sub-totalling control as disclosed completely in said R. E. Boyden application S. N. 582,553. The upper end of the link 292a is pivotally connected to a cross link 293a intermediate its ends, which link is pivotally connected to the pins 232a underlying the stems of the total and sub-total bars 17a and 18a, respectively, and carried by the aforementioned links 233a. Blocking of the link 292a from depression will correspondingly, through the link 293a block effective depression of either of the control bars 17a and 18a and thus prevent control of the machine by these bars. However, as the slide 99 is moved out of its "cash" position, the lobe 126 will allow the blocking lever 127 to rock sufficiently to move out of the path of the link 292a.

Describing now the means for preventing operation of the machine in response to depression of any of the motor operation control bars when the control knob 14 is moved to its "lock" position, a stud 133 (Figs. 9 and 11) extends from the slide 99 and underlies the irregular surface of a lever 134 pivotally supported by the side frame plate 24a by a pivot stud 135. The lever 134 is connected by a pin and slot connection 136 to a slide 137 having elongated slots 137' therein guided vertically over frame studs 138 projecting from the frame plate 24a. When the control slide 99 is in its illustrated "cash" position, the stud 133 holds the lever 134 and slide 137 in their illustrated position against the action of a spring 140 tensioned between a stud on the slide and a portion of the frame to maintain a blocking ear 141 thereon above a nose 142 extending forwardly from the clutch control slide 36. However, when the knob 14 is moved to its lock position the stud 133 advances to its alternate position indicated by the dot and dash lines 133L, allowing the slide 137 to drop to a position wherein the ear 141 lies directly in front of the nose 142, thus blocking the slide 36 from forward movement in response to depression of any of the control bars and consequent advancement of the cam slide 39.

Means are provided to normally enforce depression of a designating key in each of the two leftmost amount key banks 16 and 17 when the machine is operated as a cash register, i. e., with the knob 14 is in its "cash" position. This means, however, is rendered ineffective when the machine is operated in its "add" or "open" position and is also selectively adaptable to be arranged to enforce depression of one key only in either of the two banks 16 and 17 if such control is desired.

Referring in particular to Figs. 2 and 11 to 14, inclusive, the aforementioned key latching members 38a associated with the two left hand banks of keys 16 and 17 have suitably secured thereto identical extensions 143 and 144, respectively. The extension 143 normally lies against the outer end of a blocking lever 145 (see also Figs. 11 and 14) pivotally mounted on a stud 146 supported by a bracket 147 which is suitably fixed to the frame plate 24a. The lever 145 has a latching shoulder 148 which, when none of the keys in the lefthand bank 16 are depressed, lies in blocking relation with an ear 149 formed on the clutch control slide 36, preventing actuation thereof by depressing any of the motor control bars. A spring 150 is tensioned between an ear on the lever 145 and a stud 151 extending from a second lever 152 (see also Fig. 13), also pivoted on the stud 146, to normally hold the lever 145 in engagement with the stud 151. In turn, an extension 157 of the lever 152 is normally held in engagement with the rear edge of the slide 137 by a spring 156 extending between an ear on the lever and a part of the frame plate 24a.

The extension 144 attached to the member 38a associated with the next to the left hand bank of keys 17 lies against a second latching lever 153 also pivotally mounted on the stud 146. Lever 153 is provided with a blocking shoulder 154 identical with the shoulder 148 of lever 145 and thus also blocks movement of the slide 36 when no key in the bank 17 is depressed. The lever 153 is normally held in contact with the stud 151 on lever 152 by a spring 155 tensioned between the stud 151 and an ear on lever 153.

Depression of keys in the banks 16 and 17 will rock their associated latching members 38a outwardly to accordingly rock the respective blocking levers 145 and 153 clockwise (as viewed in Fig. 12) to remove their blocking shoulders 148 and 154 from blocking positions relative to the clutch control slide 36. It is therefore obvious that a key in each bank must be depressed in order to enable actuation of the slide 36.

Referring to Fig. 11, the slide 137 is provided with an inclined cam surface 161 which, when the machine is in its illustrated "cash" position, lies directly below the extension 157 of lever 152. However, when the knob 14 is moved to its "add" position the stud 133 of slide 99 moves to its dot-dash position 133A, camming the lever 134 and thereby the slide 137 upward whereupon the cam surface 161 engages and cams the lever 152 clockwise (Fig. 12) to cause the stud 151 thereon to force both blocking levers 145 and 153 clockwise out of blocking relation with the slide 36. Movement of the knob 14 to the "open" or "drawer" positions does not materially effect the positioning of the lever 134 and slide 137 beyond that in which they are set when in "add" position. Thus, the levers 145 and 153 will remain out of blocking relation with the clutch control slide 36, thus obviating the necessity for depressing the designating keys during "add" and "open" operations of the machine.

From the foregoing description, it will be seen that a designating key in each of the two banks 16 and 17 must be depressed in order to enable operation of the machine. However, the machine may be arranged to permit operation upon depression of only one key in either one of the banks 16 and 17. For this purpose, a hole 202 is formed in the lever 145 which, when the levers 145 and 153 are in their blocking positions shown in Fig. 12, is directly aligned with a second hole 203 formed in the lever 153. If it is desired to require depression of only one designating key in either of the banks 16 and 17 a coupling pin 204 is fitted into the aligned holes 202 and 203, causing the levers 145 and 153 to move in unison, so that depression of a key in either bank 16 or 17 will effect unblocking of the clutch control slide 36 by both blocking levers.

The bank of designating keys 16 and 17 have no item entry functions and thus need not be operatively associated with the accumulator in the usual manner. However, to prevent operation of the racks 19a associated with such orders during totalling and sub-totalling operations, accumulator gears 50 are associated with such racks but the tens transfer mechanism is rendered ineffective to transfer units of ten from lower active orders to the two gears 50 associated with these two orders or to transfer units of ten between said two gears. In lieu of the zero stop extensions operatively connected with such gears as disclosed in the aforementioned E. P. Drake application S. N. 582,554, a star wheel 165 having ten equal spaces therein is integrally attached to each of the accumulator gears 50 in said two orders. During item entry operations the racks 19a associated with the banks of designating keys are driven forward in the usual manner, providing keys in such banks are depressed, until arrested by the depressed keys and such racks accordingly drive the associated accumulator gears 50 in the usual manner. However, during totalling and sub-totalling operations in which case all of the key lock members 38a are rocked to release their associated zero stops 42a from blocking relation with their racks, the shaft 87a is rocked counterclockwise, moving aligned levers 166 associated with the designating key banks into locking engagement with the star wheels 165, thus preventing a forward movement of the designating racks 19a during such totalling and sub-totalling operations.

The paper strip indicated by the dot-dash lines 13 of Fig. 3, upon which the various items and totals are printed, is fed from a supply roll indicated at 180, through an opening in the casing 12, over a roller 181, rotatably mounted on brackets 182 secured to the top of the casing 12, through an opening 183 formed in the rear of the cover 361a, under a take-up roll 184, from whence it passes around the platen 12a. The strip 13 is then passed over the top surface of the cover 361a, into an opening formed under the cover 113, and thence onto the take-up roll 184.

Figure 8:
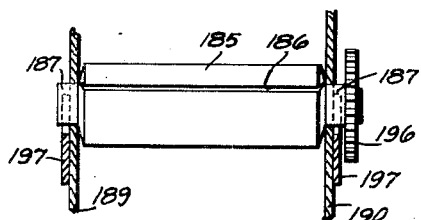
Fig. 8 is a sectional view taken along the line 8—8 of Fig. 3 illustrating the paper take-up reel.

The strip 13 is attached to a reel 185 (Fig. 8), forming the core of the roll 184, by inserting the leading edge of the strip into a longitudinally extending slot 186 formed in the reel. The core is provided with trunnion bearing portions 187 which are rotatably supported in bearing portions formed at the bottoms of open ended slots 188 formed in spaced frame plates 189 and 190 suitably secured in a manner not shown to the machine framework.

The platen 12a is automatically advanced a predetermined interval during each machine operation and the take-up reel 185 is driven by the platen through a drive train comprising an endless flexible or spring belt 191 mounted over a pulley 192 attached to the platen and a second pulley 193 rotatably mounted on a frame stud 194. A gear 195 integral with the pulley 193 is arranged to mesh with a second gear 196 integrally attached to the reel 185, when the latter is in place.

The reel 185 is normally held at the ends of the bearing slots 188, as shown, with the gear 196 meshing with its drive gear 195, by retainers 197 yieldably engaging the trunnion portions 187 on opposite ends of the reel. Each retainer is pivoted on its associated frame plate 189 or 190 by a pivot stud 198 and is yieldably held in retaining position, as illustrated in Fig. 3, by a spring 199 tensioned between the retainer and a frame stud 200. Each retainer engages the reel bearing through an inclined surface 201 which yieldably holds the reel in its illustrated position. However, the reel may be forced outwardly along the slots 188 and thus removed when it is desired to remove or replace the roll of paper thereon. This arrangement facilitates removal and replacement of the roll of paper in the machine without connecting or disconnecting the usual coupling means between the same and the driving devices.

It will be noted that a line passing through the centers of the gears 195 and 196 extends at an angle of approximately 60° to the lengths of the slots 188. This arrangement of the gears results in less tendency of the teeth of the gears to clash when inserting the reel than would be the case if the line extending between the gear centers were parallel to the lengths of the slots 188. Also, with this particular arrangement of the gear centers, the resultant forces are such as to tend to hold the trunnion bearing portions against the forward ends of the slots 188.

A pawl 205, pivoted on the frame plate 190 at 205', is held in engagement with the teeth of gear 195 by a spring 206 tensioned between the pawl and a stud on the frame plate to prevent rotation of the gear 195 in a counter-clockwise direction.

Means are provided to prevent operation of the machine when the cash drawer is out of closed position and thus require closing of the drawer after each transaction. For this purpose, a blocking lever 2222 (Figs. 11 and 17) is pivoted on a frame stud 223 and is urged counter-clockwise by a spring 224 tensioned between the lever and a frame stud 225 to engage the lower end thereof with the rear of the cash drawer 11.

The forwardly extending arm of lever 2222 is provided with a locking shoulder 226 which, when the drawer is in closed position (as illustrated in Fig. 17) is held below the stud 227 of clutch dog 58a. However, upon movement of the drawer 11 toward open position, the spring 224 becomes effective to rock the lever 2222 clockwise and thereby position the locking shoulder in its alternate position, blocking clutch engaging movement of the clutch dog 58a.

If desired, the spring 224 may be disconnected from the lever 2222 whereby the latter will swing counter-clockwise of its own gravity to a position where it will be ineffective to prevent engagement of the clutch even though the drawer 11 is moved to open position.

Figs. 15 and 16 illustrate a transparent cover 207 of plastic or the like which is adapted to be locked in place over the opening 208 formed in the machine cover 361a over the printing mechanism. This cover enables the printing mechanism to move into the opening 208 and also allows the operator to view the values printed on the tape 13, immediately after the printing operation, and at the same time prevents tampering with the printing mechanism while allowing ejection of the printed portion of the tape.

As disclosed in the aforementioned R. E. Boyden application, S. N. 582,553, the printing mechanism comprises a series of printer dials 135a carried in side by side relation independent of each other on individual arms 136a mounted for limited rotatable movement on a printer control shaft 137a. Springs 138a tend to rock the arms 136a clockwise to cause the dials to strike the paper tape 13 at the printing point P in a printing operation. The shaft 137a is provided with diammetrically opposed grooves, the edges of which normally engage inwardly extending teeth formed on the levers 136a to hold the arms in their outer illustrated positions until the printing phase of the operating cycle, at which time the shaft is rocked clockwise to allow the printer arms 136a to follow and thus strike the tape 13.

The transparent cover 207 is provided with side flanges 209, the lower sections 209a of which extend into the opening 208. Flange sections 209a are provided with lips 210 at their forward ends which are arranged to engage under the edge of the cover 361a at the forward end of the opening 208, thus locking the forward end of the cover 207 in place. Similar rearwardly extending lips 211 are formed on the flange sections 209a and such lips are arranged to be engaged by locking members 212 each formed of a thin resilient metal strip, to lock the cover in place. Each locking member is provided with a slot 214 slidably mounted on a guide stud 215 fixed to the cover 361a. The lower end of each member 212 has attached thereto a knob 216 extending through a slot 317 in the cover 361a whereby, when the rear cover 113 is removed, the respective member 212 may be drawn downward to release the upper forward end thereof from engagement with the lip 211. A spring 217 is tensioned between each stud 215 and the respective knob 216 to normally hold the strips in their upper rearward locking positions as illustrated. It should be noted that the rear end of each lock-member 212 springs upwardly so as to engage, at all times, the under surface of the cover 361a.

The rear edge of the cover 207 is provided with an opening 218 through which the paper tape 13 may extend. The upper edge of this opening is provided with a serrated edge 219 forming a severing or tear-off edge in the event it is desired to issue tape receipts. For example, it may be desired to use a carbon bi-pack tape formed of two strips wound together, the outer strip 13b being provided with a carbon transferring coating on the rear surface thereof so that it may pass through the opening 218 to be torn off when desired while the inner strip is passed over the upper surface of the cover 361a and onto the supply roll as shown in Fig. 3.

In order to prevent unauthorized tampering of the machine, as by placing a knife or other object through the opening 218 to prevent printing operation of the dials 135a, a partition 220 is formed within the transparent cover 207 and extends into the opening 208 to a point directly adjacent the path of the paper tape 13. The lower edge of the partition 220 is formed into a series of teeth 221 which curve rearward to form hooks so as to catch and block any paper, card or other sheet material which may be inserted through the opening 218.

It will be noted that the knobs 216 on the locking members 212 are located within the rear cover 113 and thus may not be manipulated to release the transparent cover 207 until the rear cover 113 is removed in the manner described hereinbefore. Also lugs 230 are secured to the inner surface of the rear cover to maintain the knobs 216 in locking position when the cover is in place.

In order to magnify the image of the last value printed on the tape 13, the center section of the cover may be formed lenticular in shape, as by providing a convex lower contour indicated by the dotted lines 1222 so that the operator may see the printed value in magnified form.

Although we have described our invention in detail and have therefore used certain terms and languages herein, it is to be understood that the present disclosure is illustrative rather than restrictive, and that changes and modifications may be made without departing from the spirit or scope of the invention as set forth in the claims appended hereto.

Having thus described the invention, what we desire to secure by U. S. Latters Patent is:

1. A cash registering machine comprising the combination of a cash drawer casing, a cash drawer movable into and out of said casing, a registering mechanism associated with said cash drawer, and carried by said casing, a cover for said registering mechanism, means for securing said cover to said casing, means accessible only from the interior of said casing and when said drawer is out of said casing for releasing said securing means, and means for selectively locking said drawer in said casing.

2. A cash registering machine comprising the combination of a cash drawer casing, a cash drawer movable into and out of said casing, control mechanism for said drawer mounted on said casing, a cover for said control mechanism, means for locking and unlocking said cover in position, said locking means being accessible only from the interior of said casing and when said drawer is out of said casing, and means for selectively locking said drawer in said casing.

3. In a motor driven cash registering machine having a register, differential actuators therefor, and depressible amount keys for controlling said actuators, the combination comprising drive means for said actuators including a clutch, a plurality of groups of designating keys, clutch engaging controls, a pair of blocking elements normally blocking movement of said clutch controls, means actuated by a key in one of said groups upon depression thereof for moving one of said elements out of blocking position, means actuated by a key in another of said groups upon depression thereof for moving the other of said elements out of blocking position, and mechanism selectively settable into any of a plurality of positions and operable upon movement thereof into one of said positions for moving both of said blocking elements out of blocking position, said selectively settable mechanism being effective upn movement thereof into another of said positions for directly blocking said controls.

4. In a motor driven cash registering machine having a register, differential actuators therefor, and depressible amount keys for controlling said actuators, the combination comprising drive means for said actuators including a clutch, a group of designating keys, clutch engaging controls, a device normally preventing operation of said controls, means controlled by depression of any one of said designating keys for rendering said operation preventing device ineffective, a device manually settable into any of a plurality of positions, and mechanism responsive to movement of said manually settable device into one of said positions thereof for rendering said operation preventing device ineffective and responsive to movement of said manually settable device into another of said positions thereof for directly preventing operation of said controls and settable in to a third position for enabling operation of said controls and for rendering said operation preventing means effective.

5. In a power driven cash registering machine having a cash drawer movable into and out of closed position, spring means for moving said drawer to open position and a latch for normally holding said drawer in closed position, the combination comprising power driven means including a yieldable device for moving said latch to drawer releasing position, a manually manipulatable device selectively settable into any of three positions, a blocking element settable by said manipulatable device upon movement thereof into one of said positions to block said latch from movement, said element being settable by said manipulatable device upon movement thereof into a second one of said positions to enable movement of said latch by said power driven means, and a camming element operable by said manipulatable device and operable upon movement thereof into the third one of said positions to cam said latch into latch releasing position.

6. In a combined adding and cash registering machine having a register, differential actuating mechanism therefor, means including a totalling device for controlling said register and actuating mechanism to obtain totals from said register, a cash drawer movable into and out of closed position, means for locking said drawer in closed position, and means for normally releasing said locking means as an incident to operation of said actuating mechanism; the combination comprising a manipulatable device selectively settable into either of two positions, means including a pair of blocking devices operable by said manipulatable device, one of said blocking devices being operable in response to movement of said manipulatable device into one of said positions to block said totalling device from operation and the other of said blocking devices being operable in response to movement of said manipulatable device into the other of said positions to block said lock releasing means from operation.

7. In a combined adding and cash registering machine having a register, differential actuating mechanism therefor, means including a totalling device for controlling said register and actuating mechanism to obtain totals from said register, a cash drawer movable into and out of closed position, means for locking said drawer in closed position, and means for normally releasing said locking means as an incident to operation of said actuating mechanism; the combination comprising a manipulatable device selectively settable into any of three positions, a blocking element operable by said manipulatable device and effective upon movement of said manipulatable device into one of said positions to block said totalling control device from operation, a second blocking element operable by said manipulatable device and effective upon movement of said manipulatable device into a second one of said positions to block said lock releasing means from operation, and a releasing element operable by said manipulatable device and operable upon movement of said manipulatable device into the third of said positions to directly release said locking means.

8. In a combined adding and cash registering machine having a register, differential actuating mechanism therefor, means including a totalling device for controlling said register and actuating mechanism to obtain totals from said register, a cash drawer movable into and out of closed position, means for locking said drawer in closed position, and means for normally releasing said locking means as an incident to operation of said actuating mechanism; the combination comprising a manipulatable device selectively settable into any of four positions, a blocking element carried by said device and effective upon movement of said manipulatable device into one of said positions to block said totalling control device from operation, a second blocking element carried by said device and effective upon movement of said manipulatable device into a second one of said positions to block said lock releasing means from operation, a releasing element carried by said manipulatable device and operable upon movement of said manipulatable device into a third one of said positions to directly release said locking means, and means operable by said manipulatable device upon movement thereof into the fourth one of said positions to prevent operation of said actuating mechanism.

9. In a power driven cash registering machine having a register, differential actuating mechanism therefor, a housing for at least part of said register and said actuating mechanism, a cash drawer casing, a cash drawer movable into and out of said casing, spring means for moving said drawer to open position, and a latch for normally holding said drawer in closed position; the combination comprising means including a yieldable device operable as an incident to operation of said actuating mechanism for normally moving said latch to latch releasing position, a manually manipulatable device, a blocking element operable by said manipulatable device and adapted to block said latch from movement, a locking element operable by said manipulatable device and adapted to lock said housing in housing position, said manipulatable device being selectively settable into a first position to move said blocking element to block said latch from movement to latch releasing position and to move said locking element to lock said cover in covering position, said manipulatable device being selectively settable into a second position to move said blocking element to enable said latch to move to latch releasing position and to move said locking element to unlock said housing.

10. In a power driven cash registering machine having a cash drawer movable into and out of closed positions, a register, differential actuating mechanism therefor, controls including a first manually depressible bar for controlling said actuating mechanism for entering amounts into said register, and controls including a second manually depressible bar for controlling said actuating mechanism to take totals from said register; the combination comprising drive means for said actuating mechanism including a clutch; means responsive to said drive means upon operation thereof for causing said drawer to move to said open position, a clutch control member arranged to be actuated by either of said bars upon depression thereof, a device for causing engagement of said clutch, means yieldably connecting said clutch control member with said clutch engaging device to normally transmit clutch engaging movement thereto, a selecting device selectively settable into either of two positions, means settable by said selecting device upon movement thereof into one of said positions to prevent said second depressible bar from actuating said clutch control member and means settable by said selecting device upon movement thereof into the other of said positions to prevent actuation of said clutch engaging device by said clutch control member.

11. In a power driven cash registering machine having a cash drawer movable into and out of closed position, a register, differential actuating mechanism therefor, controls including a first manually depressible bar for controlling said actuating mechanism to enter amounts into said register; and controls including a second manually depressible bar for controlling said actuating mechanism to take totals from said register; the combination comprising drive means for said actuating mechanism including a clutch; means responsive to said drive means upon operation thereof for causing said drawer to move to open position, a clutch control member arranged to be actuated by either of said bars upon depression thereof, a device for causing engagement of said clutch, means yieldably connecting said clutch control member with said device to normally transmit clutch engaging movement thereto, a device normally blocking movement of said clutch engaging device, a group of designating keys, means responsive to depression of any one of said designating keys for disabling said blocking device from blocking said clutch engaging device, a selecting device selectively settable into either of two positions, a second blocking device settable by said selecting device upon movement thereof into one of said positions to prevent said second depressible bar from actuating said clutch control member, and means settable by said selecting device upon movement thereof into the other of said positions to prevent actuation of said clutch engaging device.

12. In a motor driven cash registering machine having a register, differential actuators therefor, and depressible amount keys for controlling said actuators, the combination comprising drive means for said actuators including a clutch, a group of designating keys, clutch engaging controls, a blocking element normally blocking movement of said clutch controls, means actuated by one of said designating keys upon depression thereof for moving said element out of blocking position, and mechanism selectively settable into any of a plurality of positions and operable upon movement thereof into one of said positions for moving said blocking element out of blocking position, said selectively settable mechanism being effective upon movement thereof into another of said positions for directly blocking said controls.

ROBERT E. BOYDEN.
HOLLAND H. FREEMAN.

REFERENCES CITED

The following references are of record in the file of this patent:

UNITED STATES PATENTS

| Number | Name | Date |
|---|---|---|
| 1,753,288 | Fuller | Apr. 8, 1930 |
| 1,795,115 | Green | Mar. 3, 1931 |
| 1,817,883 | Shipley | Aug. 4, 1931 |
| 1,825,783 | Dunning | Oct. 6, 1931 |
| 1,829,727 | Barrett | Nov. 3, 1931 |
| 1,836,477 | Lippert | Dec. 15, 1931 |
| 1,847,532 | Kropft | Mar. 1, 1932 |
| 1,873,760 | Green | Aug. 23, 1932 |
| 1,874,164 | Brand | Aug. 30, 1932 |
| 1,913,510 | Racz | June 13, 1933 |
| 1,914,401 | Butler | June 20, 1933 |
| 2,070,063 | Pasinski | Feb. 9, 1937 |
| 2,071,388 | Breitling | Feb. 23, 1937 |
| 2,098,486 | Clark | Nov. 9, 1937 |
| 2,101,636 | Breitling | Dec. 7, 1937 |
| 2,167,715 | Green | Aug. 1, 1939 |
| 2,229,007 | Showers | Jan. 14, 1941 |

FOREIGN PATENTS

| Number | Country | Date |
|---|---|---|
| 387,973 | Great Britain | Feb. 16, 1933 |